(12) United States Patent
Punzo et al.

(10) Patent No.: US 8,986,550 B2
(45) Date of Patent: Mar. 24, 2015

(54) METHOD AND A MODULAR SYSTEM FOR ONBOARD TREATMENT OF BALLAST WATER (75) Inventors: Pasquale Punzo, Oliveto Citra (IT); Giuseppe Balzano, Oliveto Citra (IT)

(73) Assignee: Artes Ingegneria S.p.A., Oliveto Citra (IT)

( * ) Notice: Subject to any disclaimer, the term of this patent is extended or adjusted under 35 U.S.C. 154(b) by 0 days.

(21) Appl. No.: 14/127,197

(22) PCT Filed: Jun. 18, 2012

(86) PCT No.: PCT/EP2012/061590
§ 371 (c)(1),
(2), (4) Date: Dec. 18, 2013

(87) PCT Pub. No.: WO2012/175452
PCT Pub. Date: Dec. 27, 2012

(65) Prior Publication Data
US 2014/0116962 A1 May 1, 2014

(30) Foreign Application Priority Data
Jun. 21, 2011 (IT) ................ MI2011A1127

(51) Int. Cl.
*B01D 35/06* (2006.01)
*B63J 4/00* (2006.01)
(Continued)

(52) U.S. Cl.
CPC .............. *B63J 4/002* (2013.01); *C02F 1/325* (2013.01); *C02F 1/001* (2013.01); *C02F 2103/008* (2013.01)
USPC ............. 210/748.11; 210/748.13; 210/749; 210/748.01; 210/153; 422/186; 422/24; 422/186.3; 422/108; 422/243; 250/200; 250/428; 250/432 R; 250/436; 250/504 R (58) Field of Classification Search
CPC ............ B01D 35/06; C02F 1/50; C02F 1/32; C02F 3/00
USPC ......... 210/138, 143, 148, 153, 198.1, 748.01, 210/748.1, 748.11, 748.13, 749, 758, 348; 422/22, 24, 105, 108, 110, 115, 116, 422/129, 186, 186.3, 243; 250/200, 428, 250/430, 432 R, 436, 435, 493.1, 504 R
See application file for complete search history.

(56) References Cited

U.S. PATENT DOCUMENTS 3,676,983 A 7/1972 Nold
5,192,451 A 3/1993 Gill
(Continued)

FOREIGN PATENT DOCUMENTS

DE 29806719 U1 * 8/1998
DE 102004051621 4/2006
(Continued)

OTHER PUBLICATIONS

Alan H. Taylor, Suggested Designs to Facilitate Improved Management . . . , Existing Ships, Internet Citation, pp. 1-68, 2007.
(Continued)

*Primary Examiner* — Walter D Griffin
*Assistant Examiner* — Cameron J Allen
(74) *Attorney, Agent, or Firm* — Silvia Salvadori, P.C.

(57) ABSTRACT

A method and a modular system for performing a sterilizing treatment of ballast waters (12) onboard of a ship (10), for reducing and/or removing the contents of invasive living micro-organisms. A water loading pump (13) and a water preliminary filtering stage (14) are operatively connected to a plurality of ballast water storing tanks (11); a UV sterilizing apparatus (18) for the ballast water is submerged into the ballast water in each water storing tank (11), and is operatively connected to a local control unit (QE). Each UV sterilizing apparatus (18) comprises a UV radiation source (28). The ballast water (12) inside each storing tank (11) is recirculated although the UV radiation source (28), for a required time and mixed with the ballast water inside the water storage tank (11) to enable the living micro-organisms to be substantially reduced or eliminated, during the navigation.

8 Claims, 4 Drawing Sheets

(51) Int. Cl.
*C02F 1/32* (2006.01)
*C02F 1/00* (2006.01)
*C02F 103/00* (2006.01)

(56) References Cited

U.S. PATENT DOCUMENTS

| | | |
|---|---|---|
| 5,376,282 A | 12/1994 | Chang |
| 5,578,166 A | 11/1996 | Hirota |
| 6,447,720 B1 | 9/2002 | Horton, III et al. |
| 7,618,536 B2 * | 11/2009 | Haeffner et al. ............. 210/610 |
| 8,618,522 B2 * | 12/2013 | McKinney ................ 250/504 R |
| 2002/0030011 A1 | 3/2002 | Constantine et al. |
| 2004/0134861 A1 | 7/2004 | Brodie |
| 2008/0277354 A1 * | 11/2008 | Baerheim et al. ............. 210/750 |
| 2009/0032447 A1 | 2/2009 | Ueki et al. |
| 2009/0071389 A1 * | 3/2009 | Randall ........................ 114/125 |

FOREIGN PATENT DOCUMENTS

| | | |
|---|---|---|
| DE | 102010046409 | 4/2011 |
| KR | 20100088228 | 8/2010 |

OTHER PUBLICATIONS

Efi Tsolaki, et al., Technologies for Ballast Water Treatment . . . , J. Chem. Tech. Biot., vol. 85, No. 1, pp. 19-32, 2010.
International Search Report issued in counterpart PCT Application No. PCT/EP2012/061590.
Written Opinion of International Searching Authority issued in counterpart PCT Application No. PCT/EP2012/061590.

* cited by examiner

METHOD AND A MODULAR SYSTEM FOR ONBOARD TREATMENT OF BALLAST WATER

This application is a U.S. national stage of PCT/EP2012/061590 filed on Jun. 18, 2012 which claims priority to and the benefit of Italian Application No. MI2011A001127, filed on Jun. 21, 2011, the contents of which are incorporated herein by reference.

BACKGROUND OF THE INVENTION

The present invention relates to an onboard treatment of ballast waters for ship units, which may contain potentially noxious and invasive living organisms, and in particular is directed to a method and a system for sterilizing ballast water by UV radiations, wherein, advantageously, the sterilisation can be carried out both with the ship unit stationary in a port and during the navigation.

The ballast waters are normally used by ship units during the transport both of goods and passengers, in order to balance their own cargo and optimise the stability conditions and floating of the same ship; generally, the ballast water is loaded into suitable storing tanks, positioned in the lower portion of the hull, according to variable balancing requirements of the ship. A standard ballasting procedure for a ship unit provides the loading of the ballast water when the ship is standing in a port, and successively unloading said ballast water, before or on arrival in a port or site different from the starting one, wherein the load conditions or the balancing requirements for the ship could be changed.

Consequently, it may happen that, native species and/or living micro-organisms of an ecosystem, withdrawn from a natural habitat of a starting port or site, can be unloaded in an arrival port or site, in a different ecosystem, generating potentially noxious conditions for the receiving environment. Invasive aquatic microorganisms are one of the most important problems involved in the use of ballast water on ships.

For this reason, regulations of the International Maritime Organisation (IMO) of the United Nations, directed to control and manage the ballast waters, impose the treatment of the ballast waters during charging in order to substantially eliminate the noxious living organisms, before said ballast waters are unloaded in a site or port different from the starting site or port, where the ballast waters have been loaded into the water storage tanks of a ship.

STATE OF THE ART

As disclosed by EFI TSOLAKI et al. in technologies for ballast water treatment, currently different port-based and onboard based systems exist for treating ballast waters, both of chemical and mechanical type, or combination thereof.

Some systems provide the use of chemical additives or oxidation agents, capable of removing the living organisms in the ballast water, before said ballast water is unloaded by a ship; for example, U.S. Pat. No. 5,192,451 discloses a method for preventing the growth of micro-organisms, by adding a polymer to the ballast water; however the use of chemical additives for sterilizing ballast waters can have negative effects on the environment where said waters are unloaded.

U.S. Pat. No. 5,376,282, U.S. Pat. No. 5,578,166 and U.S. Pat. No. 3,676,983 disclose the use of vacuum and stirring in order to reduce the oxygen dissolved in the water up to a level sufficient for causing the different living micro-organisms to die; however, said systems result structurally bulky and operatively complex, hard to be adapted to several types of ships.

From U.S. Pat. No. 6,447,720, the use is also known of ultraviolet radiations (UV) about treatments for sterilizing waters, since said radiations tend to alter the genetic material of the cells, preventing the reproduction of the micro-organisms, being thus considered as dead.

The use of filtration by a membrane or the use of UV radiations were variously proposed for physically removing the micro-organisms, and for causing the sterilisation of said micro-organisms, as disclosed, for example, in U.S. Pat. No. 6,500,345 and U.S. Pat. No. 7,025,889; however, said systems require the external circulation of the ballast water, through a closed circuit comprising a plurality of storing tanks for the ballast water, mutually connected in series by pipes, and a central unit for UV sterilisation, inside the engine room of the ship.

Systems of this type are characterised by remarkable external volumes, as well as require to stop the entire system, or portion of said system, for possible controlling and/or maintaining operations; furthermore, since the micro-organisms have the tendency, during the time, to grow in uncontrolled and different mode in the different ballast tanks, there is no possibility of specific treatments being controlled and carried out for each single tank.

KR-A-20100088228 suggests, in turn, to sterilise the ballast water directly in the storing tank, by UV lamps submerged in said storing tank, providing a stirring system and deflectors; however, said system suffers from an unhomogeneous sterilizing action, due to the different sterilisation efficiency of the UV lamps, that are farther away from the stirring region.

DE-A-10 2010 046409 again discloses a system for treating ballast water on ships, in a storing tank, comprising an UV radiation source for treatment of water in open basins for swimming pools, which takes away from problems involved in ballast water treatment.

Lastly US-A-2009/032447 discloses the use of a water treatment device located within a ballast tank, for removing ozone from the treated water, to prevent the corrosion of the same tank and circulation pipe line.

Summarizing, although a large number of treatment techniques exists for removing microorganisms from ballast water, none of them seems to be effective in removing all species of microorganisms.

The problem to be solved, by the present invention, consists in providing a method and a system for UV treatment of ballast waters into a storage tank onboard a ship, suitable to perform an homogeneous sterilization of the ballast water directly into the storage tank, preventing the formation of untreated dead zone of water inside the same tank.

None of the cited prior-art document, taken separately or in combination, discloses or suggests a method and a system or device suitable to solve the same problem of the present invention and a programmable treatment of the ballast water depending on the requirements of navigation conditions of a ship.

OBJECTS OF THE INVENTION

Consequently, the need exists for finding a different and alternative solution for sterilizing onboard of a ship the ballast water by UV radiations, which solution removes the typical problems of the sterilizing systems previously known.

In particular, an object of the invention is to provide a method and a system for sterilizing ballast water, onboard of ship units, directly in each single water storing tanks, by means of which method and system a strong recirculation of treated ballast water inside the same storing tank can be carried out, so as to maximise the sterilizing process, under controlled periods of time, during the navigation.

Another object of the invention is to provide an onboard system for sterilizing ballast water as previously defined, that exhibits reduced overall dimensions and enables different components of the system to be introduced into the tank and assembled by using the standard hatches normally present on the ballast water storage tanks, without the need for installing bulky pipes and external components.

A further object of the invention is to provide a modular system, that enables to adapt a sterilisation process as a function of the requirements and the capability of a single storage tank, so as to assure, in any case, a minimal treatment period of time required for completing the sterilisation.

A still further object is to provide a method and a system for UV sterilisation of ballast waters, as specified above, capable of starting the purification when necessary, and optimise the treatment periods of times as a function of the provided navigation time, in order to enable the proper sterilisation of the ballast water in each single storage tank, before unloading said ballast water at the arrival site or port; the system for sterilizing ballast water onboard of a ship according to the invention, is adapted as well for being installed at a second time into the ballast tanks of already existing ships, independently of the constructional features of each single ship.

SUMMARY OF THE INVENTION

These and still further objects of the invention are achievable by a method according to claim 1, as well as by a system according to claim 5.

The invention is directed as well to a ship unit according to claim 8, provided with a sterilizing system for the ballast waters, according to claim 4.

Thus, according to a first aspect of the invention, a method has been provided for treating and sterilizing ballast water onboard a ship, suitable for reducing and/or removing the contents of noxious living micro-organisms, in which the ballast water is filtered and subjected to a UV sterilizing treatment inside a water storage tank, characterised by the steps of:
  providing at least an apparatus for recirculation and sterilisation of the ballast water, inside the storage tank, said apparatus comprising a UV radiation source housed in a watertight casing defining a UV radiation path between a water inlet and a water outlet side;
  recirculating treated and/or partially treated ballast water from the storage tank, through the casing of the UV radiation source;
  injecting and mixing the UV treated ballast water emerging from the casing of the UV radiation source into the ballast water inside the storage tank; and
  continuing the recirculation and UV sterilisation of the ballast water into the storage tank for a time to reduce or remove from the ballast water the contents of living micro-organisms up to a prescribed value, inside the storing tank.

According to an embodiment of the invention, a method has been provided for treating and sterilizing ballast water onboard of a ship, comprising the steps of:
  continuously recirculating the ballast water from the bottom side of the storage tank;
  along a UV radiation path inside a watertight casing of a UV radiation device dipped into the ballast water of the storage tank; and
  upwardly injecting and homogeneously meshing the UV treated ballast water emerging from the casing of the UV radiation device, into the partially treated ballast water inside the storage tank.

According to another embodiment of the invention, a method has been provided for treating and sterilizing ballast water, as previously defined, onboard and during navigation of a ship, in which the recirculation and UV sterilization apparatus is operatively connected to a programmable control unit, characterised by the steps of:
  programming, said control unit, with a navigation time and a prefixed UV sterilization time;
  starting the recirculation and UV sterilisation of the ballast water for the programmed treating time;
  detecting if the treating time is elapsed, and if not, continuing the recirculation and UV sterilisation of the ballast water;
  stopping the recirculation of the ballast water and terminating the UV sterilisation when the treating time is elapsed, holding the recirculation and sterilizing apparatus in stand-by;
  detecting the period of time required for ending the navigation, and restarting the recirculation and sterilisation of the partially treaded the ballast water when a period of time required for ending the navigation is longer than a reference period of time programmed in the control unit of said recirculation and sterilizing apparatus.

According to another embodiment of the invention, a system has been provided suitable for sterilizing ballast water onboard a ship, to reduce and/or remove the contents of noxious living micro-organisms, by the method previously referred to, wherein the system comprises:
  a plurality of storage tanks for storing the ballast water, said storage tanks being connectable to a feeding pump by a filtering device;
  wherein each storage tank is provided with at least one ballast water recirculation and UV sterilizing apparatus inside each storing tank;
  each ballast water recirculation and sterilizing apparatus comprising a UV radiation source enclosed into a watertight casing, said watertight casing having an inlet side connected to a submerged pump for circulation of the ballast water, and an outlet side connected to a water distributor conformed and arranged to inject and mix the sterilised ballast water into the storage tank.

BRIEF DESCRIPTION OF DRAWINGS

These and further features of the method and the system suitable for UV sterilisation of ballast water according to the present invention, will better result from the following description and the enclosed drawings, in which.

DETAILED DESCRIPTION OF THE INVENTION

Figure 1:
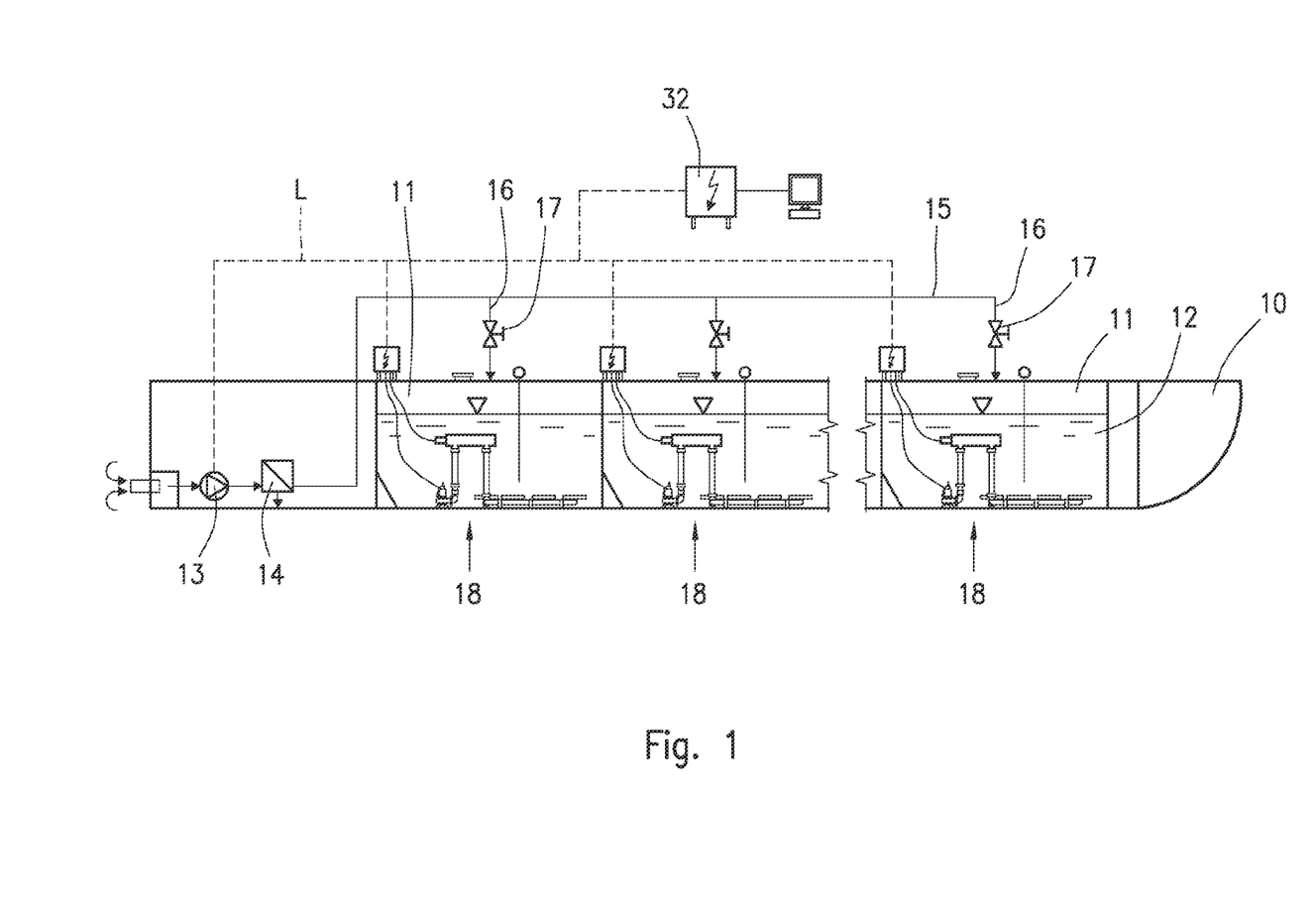
FIG. 1 schematically shows a generic ship, provided with a system for UV treatment of the ballast water, according to the present invention.

In FIG. 1, a generic ship is indicated by the reference number 10, for example a cargo for carrying goods, or a passenger ship, comprising a plurality of water storage tanks 11 designed for being partially and/or fully filled with an amount of ballast water 12, to be treated and sterilised according to known standard procedures conforming to national or IMO legislations.

The ballast water 12, sucked from an external environment by one or more pumping units 13, is loaded into the single storage tanks 11 by a filtering unit 14, configured for retaining sucked sediments and possible seaweed and sea organisms, by a main water distribution piping 15 and by branched pipes 16, each of said branched pipes 16 being provided with a control valve 17.

Figure 2:
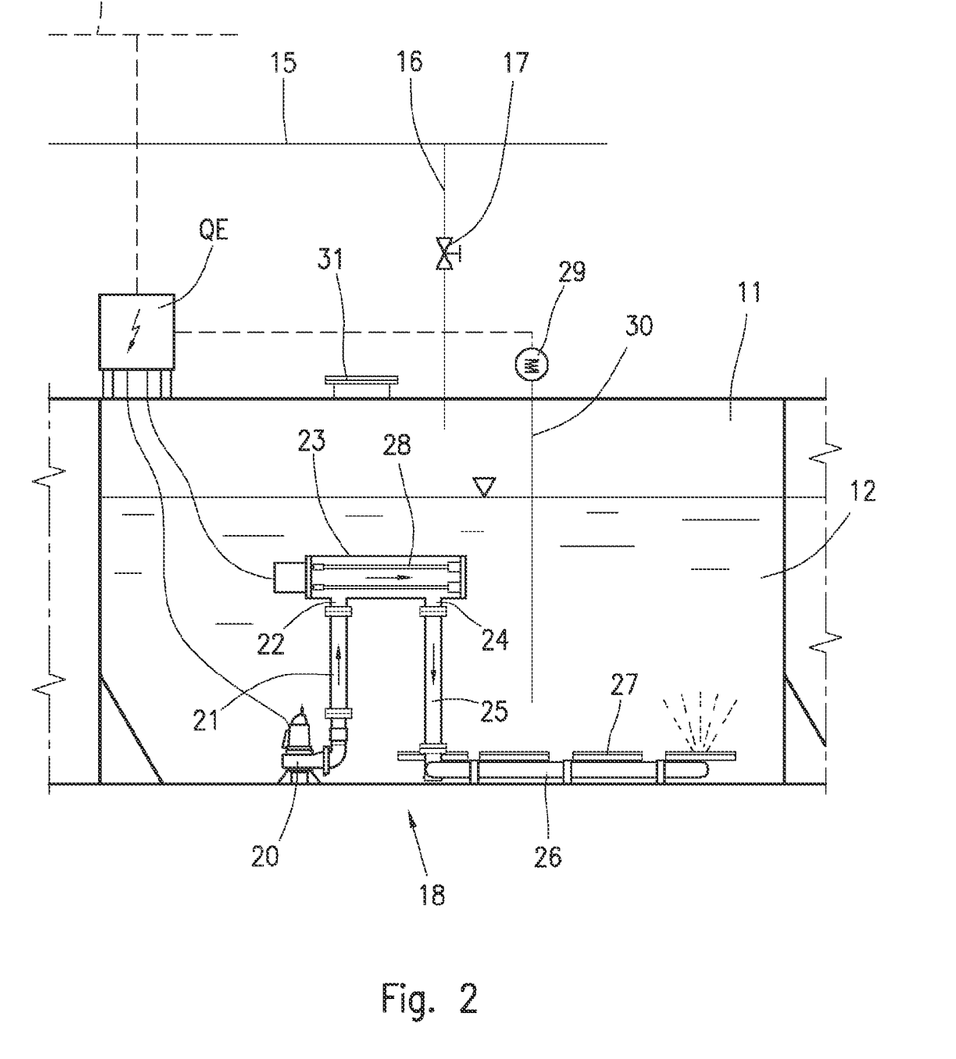
FIG. 2 is an enlarged detail of a storage tank for the ballast water, provided with a UV treating system.

As shown in FIG. 1 and the enlarged detail of FIG. 2, a water recirculation and UV sterilizing apparatus or device, generally indicated by reference number 18, is provided inside each storage tank 11, by which recirculation and UV sterilizing device 18 the ballast water 12 is continuously recirculated along a closed path into said storage tank and caused to flow through a ultraviolet (UV) radiation source.

In particular, each recirculation and UV sterilizing device 18 comprises a submerged pump 20, arranged at the bottom side of the storage tank 11, an outlet side of the pump 20 being connected, by a feeding pipe 21, to an inlet 22 of a tubular watertight casing 23, while the outlet 24 is connected, in turn, by a recirculation pipe 25, to a diffuser 26 positioned at the bottom side of the storage tank 11; the diffuser 26 comprises a plurality of nozzles 27 conformed to generate strong jets of ballast water, upwardly oriented in different injecting directions; thus, a good mixing and homogenisation is achieved of the sterilised ballast water emerging from the casing 23 of the UV sterilisation device 23 with the bulk of ballast water or partially treated ballast water 12 contained within the tank 11.

A UV radiation source is housed inside the watertight casing 23, said UV radiation source consisting, for example, of a plurality of UV lamps 28, suitable for emitting ultraviolet radiations in a prefixed frequency range, in order to kill the noxious living organisms normally present in the ballast water from the external environment.

In addition, the watertight casing 23 comprises mechanical scraping means, not shown, required for cleaning the UV lamps, as well as comprises a radiation sensor, not shown, suitable for controlling the sterilisation efficiency. A level sensor 29, provided with a probe 30, for example of capacitive type, downwardly extents into the tank 11 to provide a control signal indicative of the level of water inside the tank 11. All the components of the apparatus, in particular the submerged or canned pump 20, the casing 23 for the UV lamps 28 and the diffuser unit 26, are designed and dimensioned so as to pass through a standard hatch 31, of the manhole type, normally present in the standard ballast tanks of a ship. Consequently, the recirculation and UV sterilizing apparatus can be directly assembled inside the storage tank 11, and held in a partially or fully submerged condition, according to the amount of ballast water that, each time, is loaded into the storage tank 11; thus, any obstructive disposition of the apparatus externally to the storage tank, is avoided.

The apparatus, as shown in FIG. 2, comprises a local electronic control unit QE, operatively connected to the submerged pump 20, the UV radiations generating lamps 28 and the level sensor 29; the local electronic control unit QE is configured and programmed for controlling the recirculation and sterilisation process of the ballast water in the respective storage tank 11, as a function of program data stored in a central programmable control unit 32, consisting for example of a PLC, operatively connected to the loading pump 13 for the ballast water and to the local control units QE of the storage tanks 11, by a line L for transmitting program data and/or control signals between the central control unit 32 and the local control units QE.

Consequently, the modularity of the system so achieved, enables the installation of treating apparatuses into each single water storage tank 11; in the case of tanks of large dimensions, and depending on specific requirements, more ballast water treatment apparatuses can be provided into each storage tank, or parts of them of a ship. Thus, the sterilisation capacity of the entire system can be adjusted according to the number and dimension of the storage tanks, in order to assure a minimal treating period of time and the required level of sterilisation.

As previously referred, the sterilizing system according to the invention is provided with an intelligent control system to manage the sterilisation process, such as to start and/or stop the sterilisation of the ballast water inside each tank 11, when required, as a function of control signals generated by the level sensor 29; in addition, the intelligent control system is capable as well of independently optimising the treating period of time for each single storage tank 11, as a function of an expected navigation period of time, in order to assure a proper sterilisation of the ballast water, restarting, if necessary, the sterilisation process one or more times during the navigation, before the ballast water must be discharged at the arrival port or site.

Eventually, the use of a suitable radiation sensor enables the efficiency of the UV radiation source to be controlled, to actuate for example a suitable cleaning device for the UV lamps 28, or extending the period of time of the sterilizing treatment, with respect to a programmed period of time.

Figure 3:
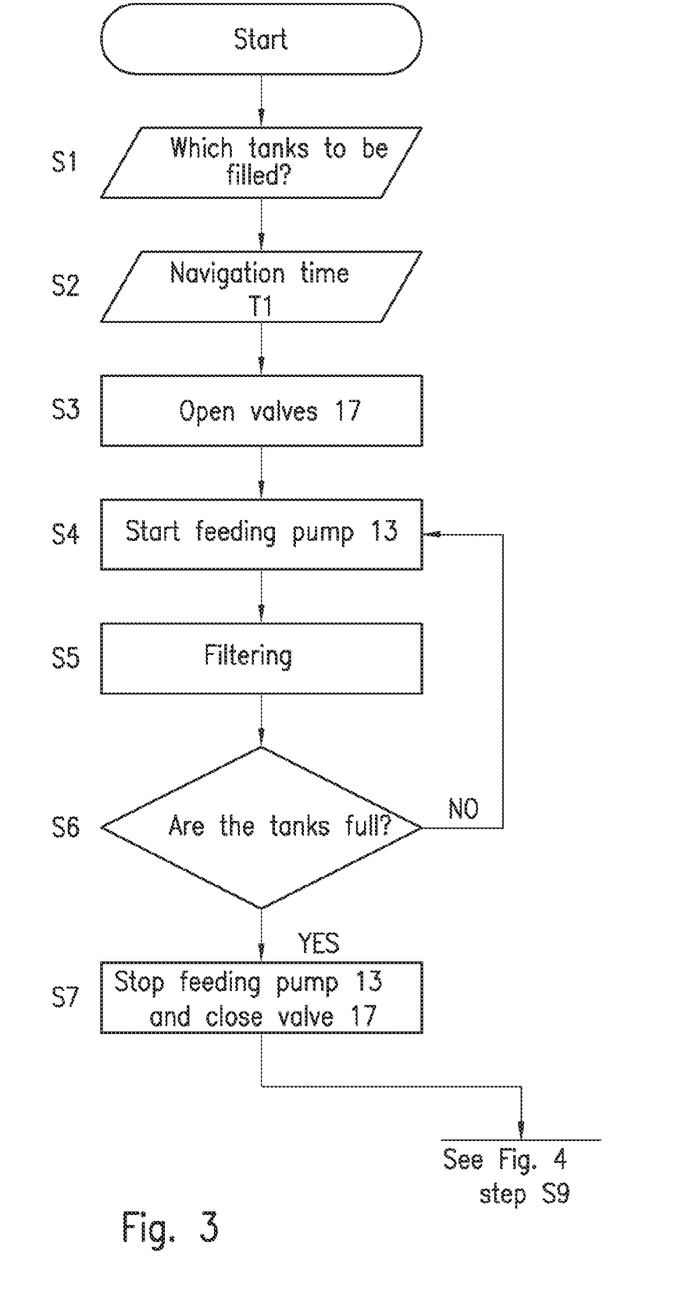
FIG. 3 is a first flow diagram showing the initial steps for filtering and loading the ballast water into the storage tanks of the ship of FIG. 1.
Figure 4:
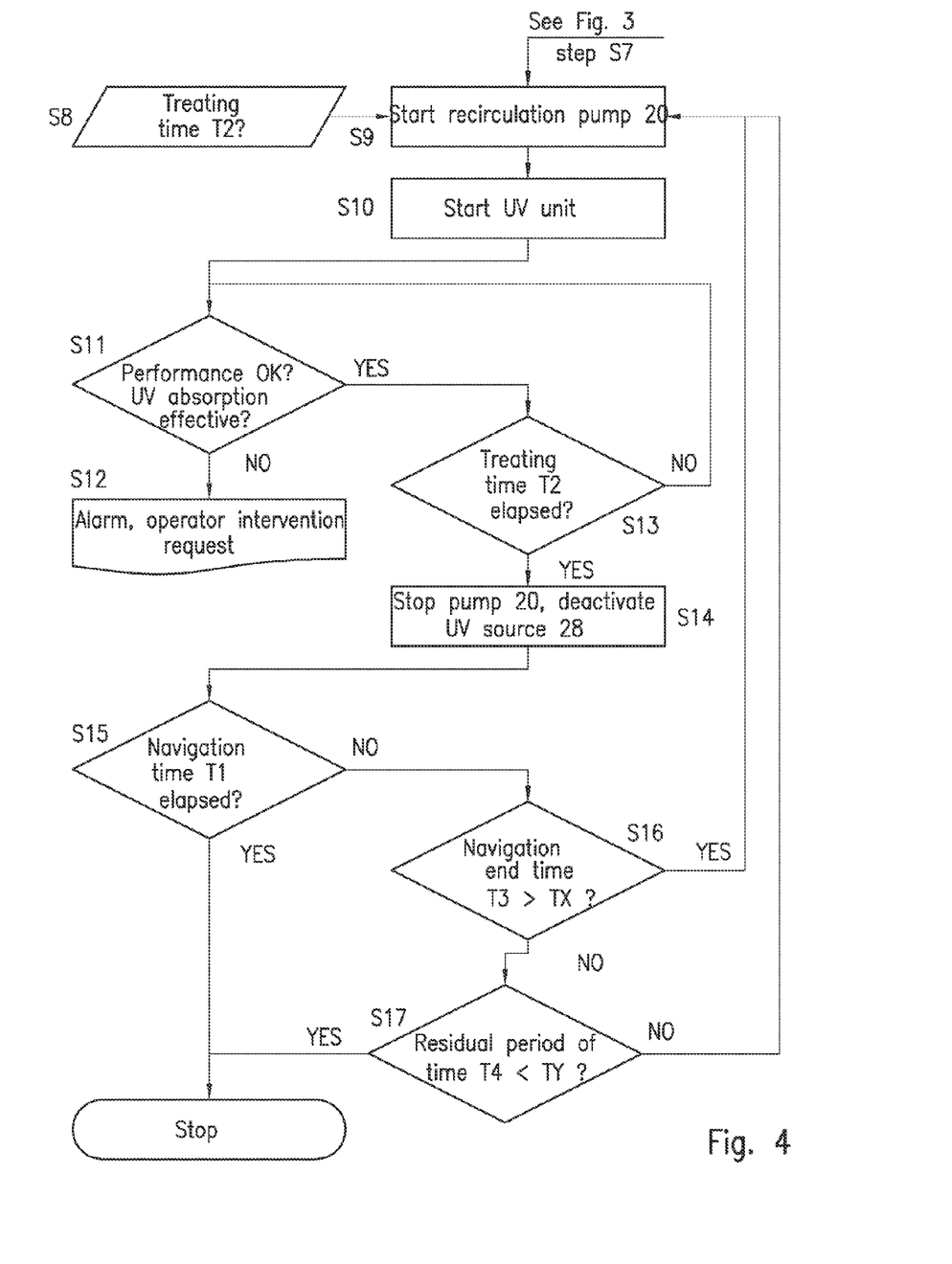
FIG. 4 is a second flow diagram of the steps for recirculation and UV treatment of the ballast water, in each single storage tanks, during navigation of the ship.

All said above, and some operative modes of the system and the method according to the invention, will be better disclosed with reference to the two flow diagrams of FIGS. 3 and 4.

As shown in FIG. 3, on start, according to program data stored in a program memory of the general control unit 32 and depending on the number, volume and disposition of the storing tanks in the ship, as well as by the type of ship and loading conditions, the system establishes which tanks 11 must be filled, that is the number and position of the storage tanks and the quantity of ballast water to be charged in each storage tank, step S1; simultaneously, step S2, the navigation time T1 for the ship is programmed, within which time T1 the ballast water must be treated and sterilised before to be unloaded at an arrival port or site.

A this point, the valves 17 of all or part of the programmed storage tanks 11 to be charged with ballast water are opened, step S3, the feeding pump 13 is started, step S4, performing the filtration of the ballast water, and the loading into the single storage tanks 11, step S5.

During the following step S6, the general control unit 32, on the base of the control signals generated by the level sensors 29, and program data received from the local control unit QE, verifies if the single tanks 11 are filled at the programmed level; if the answer is "NO", the feeding pump 13 is held in operation; if the answer is "YES", the system continues to step S7 stopping the feeding pump 13 and ordering the valves 17, that previously were opened, to be closed.

A this point, as shown in FIG. 4, the sterilisation process of the ballast water in the single storing tanks 11 is started. After the treating period of time T2, depending on the properties of the ballast water to be treated, is established into the central control unit 32, step S8; the recirculation pump 20 and the UV radiation source 28 are started under the control of the local unit QE.

The ballast water 12 is then sucked by the recirculation pump 20 directly from the bottom of the tank 11, then is forced to recirculate along a pathway internal to the storage tank 11, through the casing 23 of the UV radiation consisting of the lamps 28, and upwardly injected into the ballast water 12 contained in said tank 11, by means of the diffuser 26, homogeneously mixing the UV treated ballast water 12 with the ballast water still untreated or partially treated and mixed during the treatment period of time.

During the treatment of the ballast water, the system examines if the performances of the UV radiation source 28 and the absorption degree of the radiations are effective, according to control signals generated by a radiation detecting probe internal to the casing 23, step S11. If the answer is "NO", an alarm is started and the intervention of an operator is ordered, step S12.

If the answer is "YES", the system continues to step S13 in order to detect if the treating period of time T2, set in step S8, is elapsed or not; if the answer is "NO", the system returns to step S11; otherwise, if the answer is "YES", the system continues to step S14, stopping the recirculation pump 20, disconnecting the UV radiation source 28, placing itself in "stand-by" condition.

At this point, if the sailing time T1 is elapsed "YES", step S15, the local control unit QE stops the sterilisation process for the respective storing tank; otherwise, if the sailing time T1 is not yet elapsed, "NO", the system continues to the following step S16, examining if the period of time T3 for concluding the navigation is longer than a first prefixed and programmed reference time TX, for example of height hours.

If the answer is "YES", the system returns to step S9, starting again the recirculation pump 20 and starting again the UV radiation source 18, steps S9 and S10, for a period of time equal to or shorter than the treating period of time T2.

If the answer is "NO", the system continues to step S17 in order to know if the residual time T4=T2−T3 for concluding the navigation is shorter than a second programmed reference time TY, shorter than TX, for example shorter than two hours, i.e. such that in the lapse of residual period of time T4 a substantial reduction of the living micro-organisms is obtained and conditions for regeneration of the micro-organisms in the ballast water do not occur.

If the answer is "NO", i.e. if the residual period of time T4 is longer than TY, the system returns again to step S9. Otherwise, if the answer is "YES", i.e. if the residual period of time T4 is shorter than TY, whereby risks for regeneration of the micro-organisms do not more exist, the system definitively stops the apparatus and the process of sterilisation, whereby the ballast water, suitably sterilised, can be unloaded in the arrival port or site.

The invention claimed is:

1. A method for treating and sterilizing ballast water onboard a ship during navigation, suitable for reducing and/or removing the contents of living micro-organisms, wherein the ballast water is filtered and then subjected to a sterilizing treatment by UV radiations within at least one storing tank, characterized by the steps of:
    providing at least an apparatus for recirculating and sterilizing the ballast water inside the storing tank, said apparatus comprising a UV radiation source device comprising a watertight casing,
    recirculating the ballast water from the storing tank, through the internal UV radiation source, and injecting and mixing the sterilized ballast water by a diffuser with the ballast water inside the storing tank; and
    continuing the recirculation and UV sterilization of the ballast water for a period of time suitable for substantially reducing or removing the contents of living micro-organisms into the ballast water, inside the storing tank, wherein the ballast water is continuously and repeatedly recirculated and made flowing through the UV radiation source,
    and wherein each of the sterilizing apparatuses is operatively connected to a control unit, and is characterized by the steps of:
    programming said control unit, with a sailing time (T1) and prefixed period of time (T2) for treating the ballast water, respectively;
    starting the recirculation and UV sterilization of the ballast water for the programmed treating period of time (T2);
    detecting if the treating period of time (T2) is elapsed and continuing the circulation and sterilization of the ballast water, when said treating period of time (T2) is not elapsed, respectively stopping the circulation of the ballast water and terminating the sterilization of the ballast water when the treating period of time (T2) is elapsed, holding the sterilizing apparatus in a stand-by condition; and
    detecting the required period of time (T3) for ending the navigation and starting again to recirculate and sterilize the ballast water, when the period of time (T3) required for ending the navigation is longer than a first reference period of time (TX) programmed in the control unit.

2. The method for treating ballast water according to claim 1, characterized by starting again the circulation and sterilization of the ballast water for a period of time equal to or shorter than the programmed treating period of time (T2).

3. The method for treating ballast water according to claim 1 when the required period of time (T3) for ending the navigation is shorter than the first reference period of time (TX), characterized by starting again circulation and sterilization of the ballast water if the detected residual sailing period of time (T4) is longer than a second reference period of time (TY) representative of a non-proliferation condition for living micro-organisms in the ballast water, or stopping circulation and sterilization of the ballast water if a residual sailing period of time (T4) is shorter than said second reference period of time (TY).

4. A system suitable for sterilizing ballast water aboard a ship unit, to reduce and/or remove the contents of living micro-organisms, by means of the method according to claim 1, wherein the system comprises:
    a plurality of tanks for storing the ballast water, said storing tanks being connectable to a feeding pump and a filtering device; and
    wherein each storing tank is provided with a UV radiation source, characterized by comprising:
    at least one UV sterilizing apparatus inside each storing tank for the ballast water;
    each of the sterilizing apparatuses comprising a UV radiation source enclosed within a watertight casing, an inlet side of the watertight casing being connected to a canned pump for circulation of the ballast water, an outlet side of the watertight casing being connected to a distributor conformed to inject the sterilized water into the storing tank.

5. The system for sterilizing ballast water according to claim 4 characterized by positioning the water distributor on the bottom side of the storage tank, and conforming said water distributor to upwardly inject the UV sterilized water, into the ballast water inside the storage tank.

6. The system for sterilizing ballast water according to claim 4, characterized by comprising a programmable control unit, for each sterilizing apparatus, said programmable control unit being operatively connected to the canned pump for circulation of the ballast water, and to the UV radiation source.

7. The system for sterilizing ballast water according to claim 6, characterized by comprising a sensor for monitoring the level of ballast water in the storing tank, said sensor being operatively connected to said control unit.

8. A ship unit comprising a system suitable for sterilizing ballast water, according to claim 4.

* * * * *